Oct. 2, 1951   B. N. ASHTON   2,569,967
VALVE
Original Filed Sept. 30, 1943
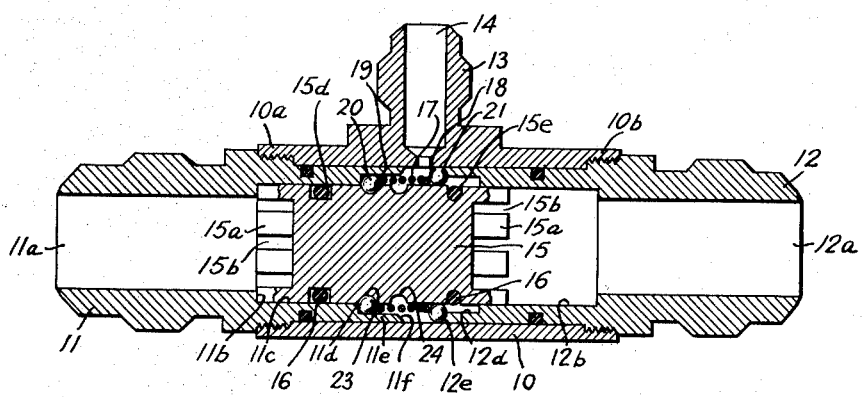
INVENTOR.
BENJAMIN N. ASHTON
BY
HIS ATTORNEYS.

Patented Oct. 2, 1951

2,569,967

UNITED STATES PATENT OFFICE 2,569,967

VALVE

Benjamin N. Ashton, Kingston, N. Y., assignor to Electrol Incorporated, Kingston, N. Y., a corporation of Delaware Original application September 30, 1943, Serial No. 504,409. Divided and this application October 16, 1947, Serial No. 780,259

6 Claims. (Cl. 251—118)

1

This invention relates to improvements in valves and it relates particularly to shuttle type valves suitable for use in combined high pressure hydraulic and gas pressure systems, such as, for example, those used in operating the landing gear, wing flaps and other movable elements of airplanes.

This is a division of application Serial No. 504,409, filed September 30, 1943, now Patent Number 2,445,505, dated July 20, 1948.

In some fluid pressure systems, two sources of pressure are provided for supplying power to a common system. For example, in aircraft having a hydraulic system for actuating landing flaps, landing gear, bomb bay doors and the like, a supplemental gas bottle is provided to supply pressure in the event that the source of hydraulic pressure is damaged. In such systems, it is highly desirable to have a valve which will automatically connect the gas bottle to the hydraulic system if the source of hydraulic pressure is damaged or rendered ineffective.

In accordance with the present invention, I have provided a valve of a type referred to herein as a shuttle valve which is responsive to differential pressures in a combined gas and hydraulic system and thereby automatically acts to connect the source having the higher pressure to the hydraulic system. This valve is characterized by a valve plug element which is shiftable lengthwise of a valve casing to connect selectively one of two sources of pressure to a pressure system for operating elements thereof. The valve is provided with spring means imparting a snap action to the valve plug but at the same time opposing displacement of the plug in response to slight variations in pressure so that movement of the valve from one of its positions to another takes place only when a substantial differential pressure is applied to the valve plug.

For a better understanding of the present invention, reference may be had to the accompanying drawing in which:

The single figure is a view in longitudinal section of a typical form of pressure responsive shuttle valve embodying the present invention.

The drawing illustrates one form of shuttle or pressure responsive valve for use in a system of the type described generally above. This form of valve includes a main tubular center casing member 10 having its opposite ends 10a and 10b provided with internal threads for receiving the couplings 11 and 12 which communicate with two different sources of fluid under pressure.

2

The casing 10 is provided with an outlet coupling 13 midway between its ends for connection with the hydraulic system of the device to be actuated. The coupling 13 is provided with an internal bore 14 which opens into the interior of the casing 10.

The coupling 11 is provided with a bore 11a which terminates at a shoulder 11b at the end of an elongated cylindrical wall portion 11c of larger diameter than the bore 11a. At the inner end of the cylindrical wall portion 11c is another shoulder 11d which joins with another cylindrical portion 11e of still larger diameter.

The coupling 12 is similarly provided with a central bore 12a and the enlarged cylindrical wall portions 12b and 12d. The inner ends 11f and 12e of the couplings 11 and 12 are oppositely inclined, so as to converge outwardly and are spaced apart for a purpose that will be described presently.

Within the cylindrical portion 11e and 12b and in sliding engagement therewith is a piston member or valve plug 15 which is provided at its opposite ends with alternate lugs 15a and passages 15b extending radially thereof. The spacing of the lugs and grooves at the opposite ends of the plug 15 is such that when the plug is moved to its farthest position to the left, the grooves 15b at the right-hand end of the plug 15 connect the passage 12a and the space between the wall 12d and the outer surface of the plug 15, thereby permitting fluid to flow through the coupling 12 past the plug and through the outlet 14. Similarly, when the plug is at its right-hand position (not shown) fluid can flow through the bore 11a, the passages 15b at the left-hand end of the plug and into and through the outlet coupling 13.

In order to prevent leakage of fluid past the plug 15, it is provided with peripheral grooves 15d and 15e adjacent its opposite ends, but disposed inwardly of the grooves 15b. Mounted within the grooves 15d and 15e are resilient rubbery rings 16 which serve to prevent leakage of the fluid past the plug in the manner described above.

The plug 15 will move in response to pressures exerted on its ends. Therefore, with the plug in the position shown in the drawing, it will be forced to the right to permit the fluid to flow through the connection 11 to the connection 14 when the fluid pressure in the conduit 11a is greater than the fluid pressure in the conduit 12a.

In order to avoid displacement of the plug 15 in response to slight variations in pressure and to assure complete movement of the plug from one position to another, spring means is provided to give a snap action to the plug. This spring means may suitably consist of a coil spring 17 encircling the plug 15 and engaging narrow rings 18 and 19 at its opposite ends which bear against an annular series of balls 20 and another annular series of balls 21, respectively. The balls 20 and 21 have a diameter such that they cannot be received in the space between the walls 11e and 12d and the plug 15. The plug 15 is provided with a pair of peripheral grooves 23 and 24 which are of a depth sufficient to receive the balls and permit them to move, with the plug 15, into the space between the walls 11e or 12d and the periphery of the plug 15. Thus, one of the sets of balls 21 is received in the groove 23, and the other series of balls 20 engages the end 12e of the coupling 12. When the pressure in the coupling 12 is diminished and the pressure in the coupling 11 is increased, the plug 15 will be urged to the right, carrying the balls 20 with it and compressing the spring 17. When the plug 15 moves to the right, balls 20 are moved along with it until adjacent inclined shoulders 11f. Spring 17 exerts a force on balls 20, pressing them against the inclined wall of the groove 23. According to the well-known triangle of forces doctrine of physics, the force of the spring in pressing balls 20 against the groove wall may be resolved into a force perpendicular to said wall, which would have no effect on moving the balls, and into an outward force parallel to the inclined groove wall, the effect of which is to cause balls 20 to move outwardly of the groove, against the shoulder 11f. At substantially the same time balls 23 are moved as described, grooves 24 come into register with balls 21, which balls are pressed against inclined shoulders 12e by spring 17. According to the doctrine of the triangle of forces, the force of spring 17 against balls 21 may be resolved into a force perpendicular to 12e, which would have no effect on moving the balls, and into an inward force parallel to 12e, the effect of which is to cause balls 21 to move inwardly into grooves 24. The positions of the balls are now reversed, balls 20 being out of their groove 23, and balls 21 being in their groove 24. When the plug 15 moves to the left, the action is reversed, and the balls return to the position of Fig. 1. At this time, the compressed spring 17 will act to snap the piston completely to its right-hand position and will expose the ports 15b at the left-hand end of the plug 15 to permit fluid to flow in the manner described above. When the pressures are reversed, the plug 15 is urged to the left, the balls 20 will enter the groove 23, the balls 21 will ride out of the groove 24 under the action of the spring 17 and the plug 15 will be snapped to its extreme left-hand position.

Shuttle valves of the type described above are responsive to differential pressures, so that in a dual hydraulic-gas system, the valve will connect the gas pressure source to the hydraulic system automatically, if the source of liquid pressure is damaged or fails.

With devices of the type described above, the presence of the sealing rings will assure a tight seal under all conditions of operation and yet will permit such looseness of fit of the valve plug within the valve casing that the plug will move easily in response to differential pressures at opposite ends of the valve plug.

I claim:

1. In a valve, the combination of a hollow casing, fluid inlets adjacent to its opposite ends and a fluid outlet between said inlets, means forming inner cylindrical walls of less diameter than the internal diameter of said hollow casing between said outlet and said inlets, said walls being spaced apart to provide a channel of greater diameter than said walls communicating with said outlet, an annular recess in about the mid-portion of said channel having shoulders at opposite sides thereof a piston member slidably engaging said cylindrical walls and spanning said channel, means forming ports in the ends of said piston for communication alternately with said channel and an adjacent inlet, a pair of peripheral grooves spaced axially of said piston, two annular series of balls engaging the periphery of said piston, spring means interposed between said balls and urging them apart, said balls being of greater diameter than the depth of said channel and less than the combined depths of the channel and recess and the combined depths of the channel and grooves in said piston member whereby when one series of balls is received in one of said grooves, the other series of balls engages in said recess and against one of said shoulders and means in said chamber comprising said shoulders cooperating with said spring means and with said balls for causing one set of balls to be moved out of one of said grooves and the other set of balls to be moved into the other of said grooves, when said piston member is urged by said spring means to a limit position permitting communication between one of said inlets and said outlet.

2. The valve set forth in claim 1 comprising means forming additional grooves in said piston disposed inwardly of said ports, and resilient rubbery rings disposed in said additional grooves and cooperating with said cylindrical walls to effect sealing engagement therewith.

3. A pressure responsive valve comprising an elongated valve housing having inlets at opposite ends, an outlet intermediate its ends, a pair of first cylindrical wall portions intermediate the inlets and the outlet and a pair of second cylindrical wall portions of greater diameter than said first wall portions disposed between said first wall portions and terminating in inclined, outwardly converging, annular shoulders on opposite sides of said outlet defining an annular recess of greater diameter than said second cylindrical wall portions between their ends, a cylindrical valve plug fitting and slidable within said first cylindrical wall portions and having a pair of peripheral, spaced-apart grooves adjacent its mid-portion and fluid passageways at opposite ends for selectively connecting said outlet to said inlets, said passageways being spaced apart a distance greater than the distance between the inner ends of said first cylindrical wall portions, two series of balls interposed between said plug and said housing, said balls having diameters less than the clearance between the bottoms of said grooves and said second wall portions and greater than the clearance between the periphery of said plug and said second wall portions, and spring means normally urging said two series of balls apart to retain one series of balls in engagement with one of said inclined shoulders and the other series of balls in one of said peripheral grooves.

4. A pressure responsive valve comprising a tubular hollow valve housing having inlets at opposite ends, an outlet intermediate its ends, spaced apart cylindrical wall portions between said inlets and said outlet terminating in annular shoulders defining an enlarged chamber in alignment with said outlet, a valve plug slidably fitting within and overlapping said wall portions in all positions of said plug, means forming substantially radial fluid passages in opposite ends of said plug to permit fluid to flow from one of said inlets to said outlet through one of said passages when the passage at the opposite end is covered by a cylindrical wall adjacent to the other inlet, a pair of peripheral spaced apart grooves in the mid-portion of said plug, a set of balls for each of said grooves, spring means urging said sets of balls apart, and means in said chamber cooperating with said spring means and with said balls for causing one set of balls to be moved out of their groove and the other set of balls to be moved into their groove.

5. A pressure responsive valve comprising a tubular hollow valve housing having inlets at opposite ends, an outlet intermediate its ends, and spaced apart cylindrical wall portions between said inlets and said outlet terminating in annular shoulders defining an enlarged chamber in alignment with said outlet, a valve plug slidably fitting within and overlapping said wall portions in all positions of said plug, means forming substantially radial fluid passages in opposite ends of said plug to permit fluid to flow from one of said inlets to said outlet through one of said passages when the passage at the opposite end is covered by a cylindrical wall adjacent to the other inlet, a pair of peripheral spaced apart grooves in the mid-portion of said plug, said grooves being spaced apart axially of said plug, a set of balls for each of said grooves, spring means urging said sets of balls apart, and means in said chamber cooperating with said spring means and with said balls for causing one set of balls to be moved out of their groove and the other set to be moved into their groove, other grooves between said passages and said pair of grooves, and toroidal, rubbery rings in said other grooves preventing escape of fluid between said cylindrical walls and said periphery of said plug.

6. A pressure responsive valve comprising a tubular hollow valve housing having inlets at opposite ends, an outlet intermediate its ends, and spaced apart cylindrical wall portions between said inlets and said outlet terminating in annular shoulders defining an enlarged chamber in alignment with said outlet, a valve plug slidably fitting within and overlapping said wall portions in all positions of said plug, fluid passages in opposite ends of said plug to permit fluid to flow from one of said inlets to said outlet through one of said passages when the passage at the opposite end is covered by a cylindrical wall adjacent to the other inlet, a pair of peripheral spaced apart grooves in the mid-portion of said plug, a set of balls for each of said grooves, spring means urging said sets of balls apart, and means in said chamber cooperating with said spring means and with said balls for causing one set of balls to be moved out of their groove and the other set to be moved into their groove, when the plug is moved to a limit position by said spring means.

BENJAMIN N. ASHTON.

REFERENCES CITED

The following references are of record in the file of this patent:

UNITED STATES PATENTS

| Number | Name | Date |
|---|---|---|
| 2,065,596 | Maccabee | Dec. 29, 1936 |
| 2,300,694 | Overbeke | Nov. 3, 1942 |
| 2,324,689 | Fraser | July 20, 1943 |
| 2,338,707 | Boynton | Jan. 11, 1944 |
| 2,360,839 | Barksdale | Oct. 24, 1944 |
| 2,372,016 | Rockwell | Mar. 20, 1945 |
| 2,408,799 | Melichar | Oct. 8, 1946 |
| 2,445,505 | Ashton | July 20, 1948 |